United States Patent
Wang et al.

(10) Patent No.: US 12,381,296 B2
(45) Date of Patent: Aug. 5, 2025

(54) INSULATING FILM ASSEMBLY AND BATTERY APPARATUS

(71) Applicant: CALB Co., Ltd., Jiangsu (CN)

(72) Inventors: Liujie Wang, Changzhou (CN); Tinglu Yan, Changzhou (CN); Zhijuan Cao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 596 days.

(21) Appl. No.: 17/945,020

(22) Filed: Sep. 14, 2022

(65) Prior Publication Data
US 2023/0344098 A1   Oct. 26, 2023

(30) Foreign Application Priority Data
Apr. 21, 2022   (CN) .......................... 202210425806.X

(51) Int. Cl.
*H01M 50/59*     (2021.01)
*H01M 50/209*    (2021.01)
(Continued)

(52) U.S. Cl.
CPC ......... *H01M 50/59* (2021.01); *H01M 50/209* (2021.01); *H01M 50/242* (2021.01); *H01M 50/503* (2021.01); *H01M 50/516* (2021.01); *H01M 50/519* (2021.01); *H01M 50/588* (2021.01); *H01M 2220/20* (2013.01)

(58) Field of Classification Search
None
See application file for complete search history.

(56) References Cited

U.S. PATENT DOCUMENTS

| 4,195,195 A | * | 3/1980 | de Miranda | ......... H05K 1/0295 |
| | | | | 361/776 |
| 2008/0310121 A1 | * | 12/2008 | Yamashita | ............. H05K 7/026 |
| | | | | 361/720 |

(Continued)

FOREIGN PATENT DOCUMENTS

| CN | 111129412 A | * | 5/2020 | .......... H01M 50/526 |
| CN | 216354634 | | 4/2022 | |
| CN | 216354634 U | * | 4/2022 | |

OTHER PUBLICATIONS

"Search Report of Europe Counterpart Application", issued on Aug. 24, 2023, p. 1-p. 6.

*Primary Examiner* — Krystal Robinson
(74) *Attorney, Agent, or Firm* — JCIP GLOBAL INC.

(57) ABSTRACT

The insulating film assembly includes a first insulating film and a second insulating film. The first insulating film is provided with a first buffering via. The first insulating film and the second insulating film are opposite to each other. The second insulating film is provided with a second buffering via. An orthographic projection of the second buffering via on the first insulating film and the first buffering via do not have overlapping regions. The first insulating film is further provided with a first buffering groove, and the first buffering groove communicates with the first buffering via. The second insulating film is further provided with a second buffering groove, and the second buffering groove communicates with the second buffering via. An orthographic projection region of the second buffering groove on the first insulating film at least partially overlaps with the first buffering groove.

20 Claims, 13 Drawing Sheets

(51) Int. Cl.
*H01M 50/242* (2021.01)
*H01M 50/503* (2021.01)
*H01M 50/516* (2021.01)
*H01M 50/519* (2021.01)
*H01M 50/588* (2021.01)

(56) References Cited

U.S. PATENT DOCUMENTS

2016/0093864 A1\* 3/2016 Nakamura .......... H01M 50/524
 429/121
2019/0045618 A1\* 2/2019 Ota ...................... H05K 1/0271

\* cited by examiner

INSULATING FILM ASSEMBLY AND BATTERY APPARATUS

CROSS-REFERENCE TO RELATED APPLICATION

This application claims the priority of China patent application serial no. 202210425806.X, filed on Apr. 21, 2022. The entirety of the above-mentioned patent application is hereby incorporated by reference herein and made a part of this specification.

BACKGROUND

Technical Field

The disclosure relates to the field of battery technology, and in particular, relates to an insulating film assembly and a battery apparatus.

Description of Related Art

With the development and progress of technology, the use of electric vehicles is gradually widespread. A battery pack is provided in an electric vehicle, and the battery pack is used to store electric energy and provide energy to the electric vehicle. The battery pack may include a plurality of batteries, but the batteries may swell during use. An insulating film assembly is thus provided on the top surface of the plurality of batteries, but when the batteries swell, there is a risk that the insulating film assembly will be torn.

Note that the above-mentioned information disclosed in the BACKGROUND section is only used to strengthen the understanding of the background of the disclosure, and therefore it may include information that does not constitute the prior art known to a person having ordinary skill in the art.

SUMMARY

According to the first aspect of the disclosure, the disclosure provides an insulating film assembly including a first insulating film, a second insulating film, and a conductive layer.

Regarding the first insulating film, the first insulating film is provided with a first buffering via.

Regarding the second insulating film, the second insulating film and the first insulating film are opposite to each other. The second insulating film is provided with a second buffering via. An orthographic projection of the second buffering via on the first insulating film and the first buffering via do not have overlapping regions, such that a single-layered film structure is formed on a first orthographic projection region on the first insulating film and a single-layered film structure is formed on a second orthographic projection region on the second insulating film. The first orthographic projection region is an orthographic projection region of the second buffering via in the first insulating film, and the second orthographic projection region is an orthographic projection region of the first buffering via in the second insulating film.

Regarding the conductive layer, the conductive layer is disposed between the first insulating film and the second insulating film, and the conductive layer comprises a busbar.

The first insulating film is further provided with a first buffering groove, the first buffering groove is located on a side of the first buffering via close to the first orthographic projection region, and the first buffering groove communicates with the first buffering via. The second insulating film is further provided with a second buffering groove, the second buffering groove is located on a side of the second buffering via close to the second orthographic projection region, and the second buffering groove communicates with the second buffering via. An orthographic projection region of the second buffering groove on the first insulating film at least partially overlaps with the first buffering groove. Orthographic projections of the first buffering groove and the second buffering groove on the conductive layer at least partially do not overlap with the conductive layer. Orthographic projections of the first buffering via and the second buffering via on the conductive layer at least partially do not overlap with the conductive layer.

According to the second aspect of the disclosure, the disclosure further provides a battery apparatus, and the battery apparatus includes the insulating film assembly.

It should be understood that the above general description and the following detailed description are only exemplary and explanatory and may not be used to limit the disclosure.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
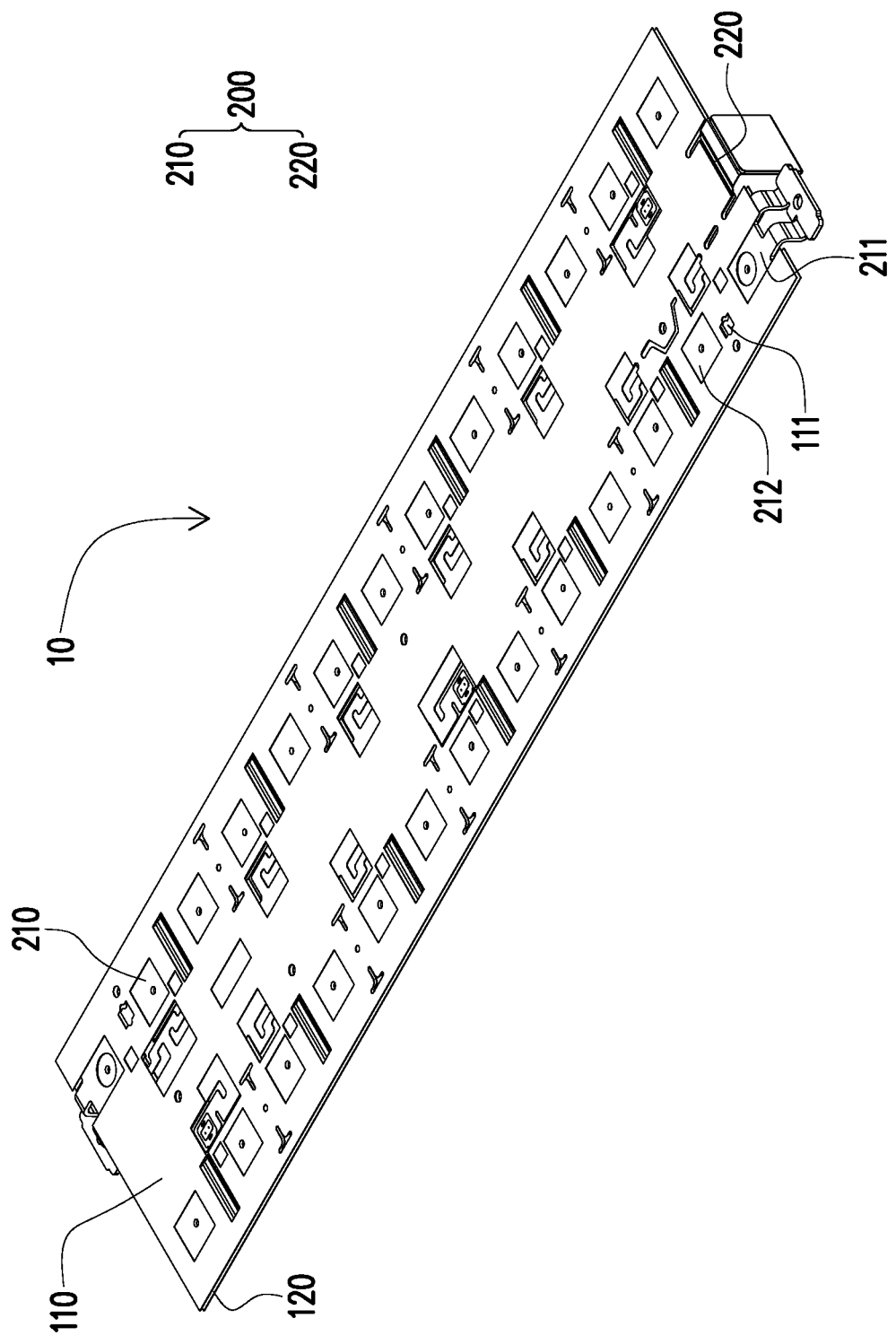
FIG. 1 is a schematic view of an insulating film assembly according to an exemplary embodiment of the disclosure.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

In an electric vehicle, energy is provided most of the time through a battery pack, and the battery pack includes a plurality of batteries. The plurality of batteries are stacked in sequence. At present, during the use of the batteries, the batteries may swell as the batteries age. The battery swelling may cause other components connected to the batteries, such as the insulating film assembly, to be torn.

The exemplary embodiments of the disclosure further provide an insulating film assembly 10. As shown in FIG. 1, FIG. 3, FIG. 4, FIG. 8, and FIG. 9, the insulating film assembly 10 includes a first insulating film 110, a second insulating film 120, and a conductive layer 200. The first insulating film 110 is provided with a first buffering via 111. The first insulating film 110 and the second insulating film 120 are opposite to each other. The conductive layer 200 is disposed between the first insulating film 110 and the second insulating film 120, and the conductive layer 200 includes a busbar 210. The second insulating film 120 is provided with a second buffering via 121. An orthographic projection of the second buffering via 121 on the first insulating film 110 and the first buffering via 111 do not have overlapping regions, such that a single-layered film structure is formed on a first orthographic projection region 113 on the first insulating film 110 and a single-layered film structure is formed on a second orthographic projection region 123 on the second insulating film 120. The first insulating film 110 is further provided with a first buffering groove 112, the first buffering groove 112 is located on a side of the first buffering via 111 close to the first orthographic projection region 113, and the first buffering groove 112 communicates with the first buffering via 111. The first orthographic projection region 113 is an orthographic projection region of the second buffering via 121 in the first insulating film 110. The second insulating film 120 is further provided with a second buffering groove 122, the second buffering groove 122 is located on a side of the second buffering via 121 close to the second orthographic projection region 123, and the second buffering groove 122 communicates with the second buffering via 121. The second orthographic projection region 123 is an orthographic projection region of the first buffering via 111 in the second insulating film 120. An orthographic projection region of the second buffering groove 122 on the first insulating film 110 at least partially overlaps with the first buffering groove 112, orthographic projections of the first buffering groove 112 and the second buffering groove 122 on a surface of the conductive layer 200 at least partially do not overlap with the conductive layer 200, and orthographic projections of the first buffering via 111 and the second buffering via 121 on the surface of the conductive layer 200 at least partially do not overlap with the conductive layer 200.

In the insulating film assembly 10 provided by the embodiments of the disclosure, by arranging the first buffering via 111 in the first insulating film 110, by arranging the second buffering via 121 on the second insulating film 120, and by not allowing the orthographic projection of the second buffering via 121 on the first insulating film 110 and the first buffering via 111 to have overlapping regions, single-layered film regions are formed on the insulating film assembly. The single-layered films exhibit good flexibility, may be easily torn, and provide good buffering effects, and that the safety of a battery apparatus may thus be improved. Moreover, arrangement of the first buffering groove 112 and the second buffering groove 122 between the first buffering via 111 and the second buffering via 121 may guide a tearing direction, and the tearing direction of the insulating film assembly may thus be easily controlled. Further, the area of the vias on the insulating film assembly may be reduced, and foreign objects are thereby prevented from entering the battery apparatus or the insulating film assembly.

Figure 2:
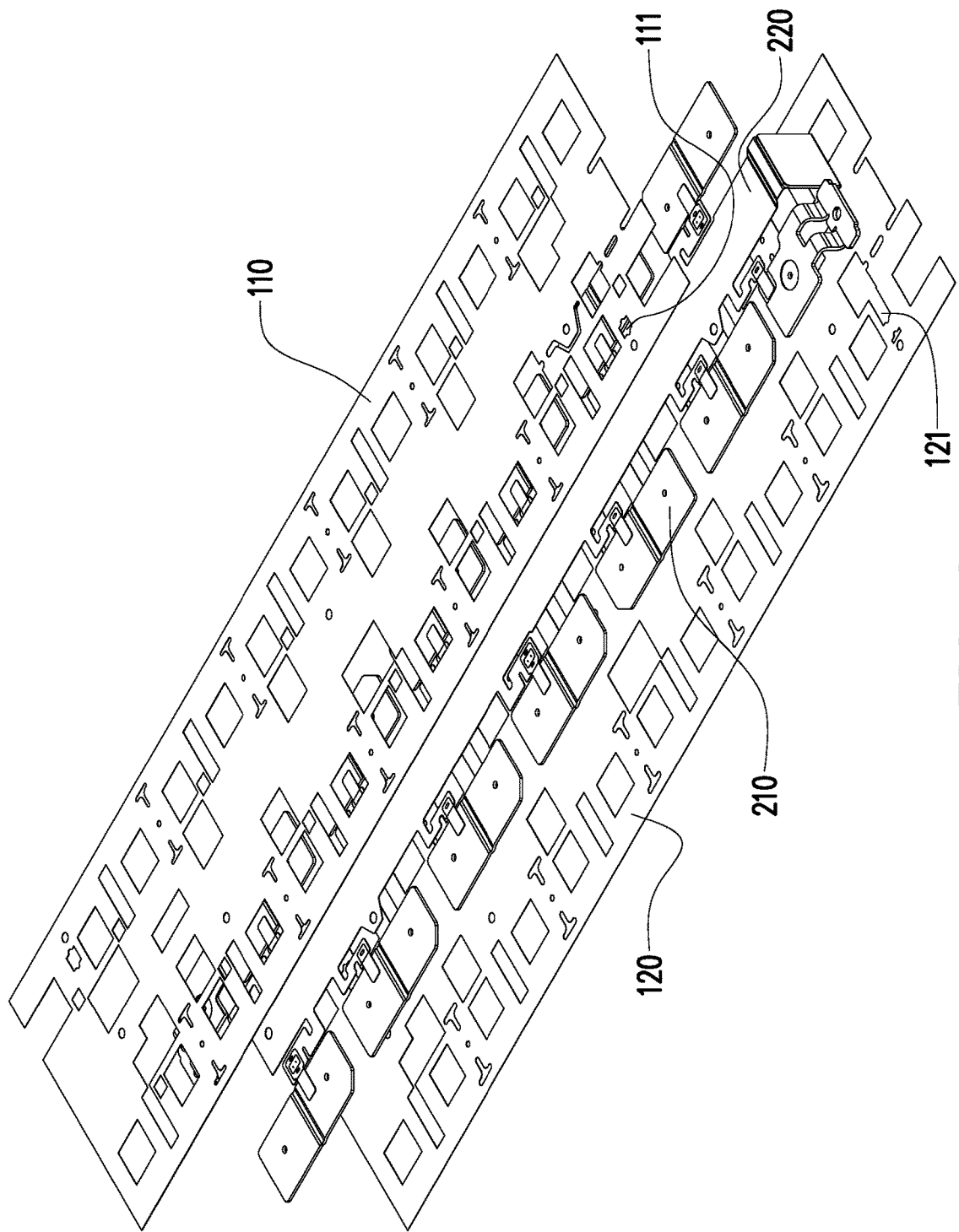
FIG. 2 is a schematic exploded view of the insulating film assembly according to an exemplary embodiment of the disclosure.
Figure 3:
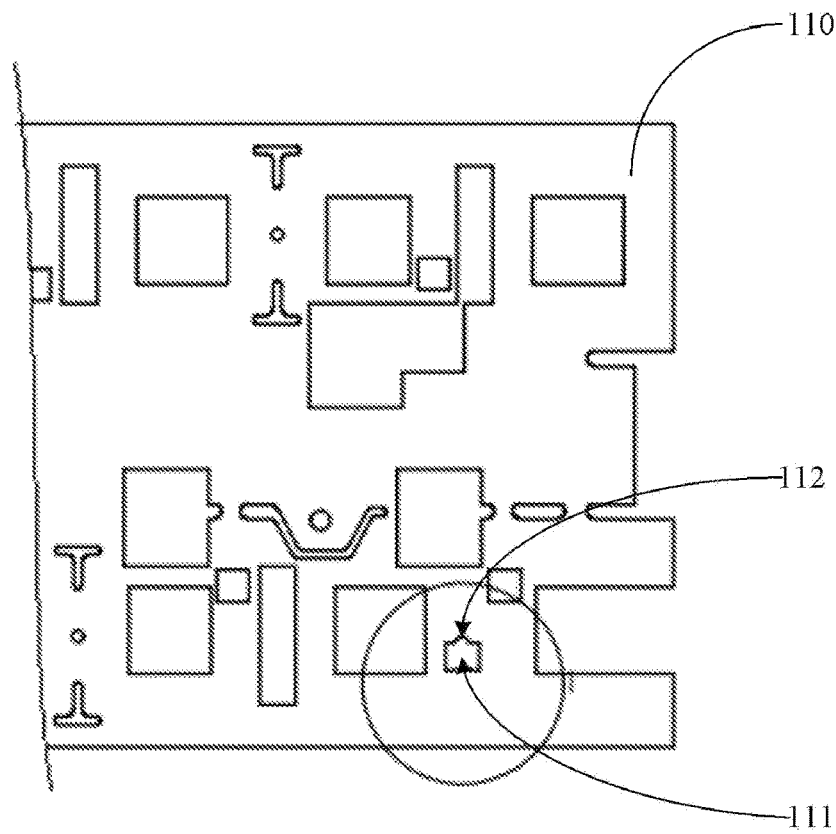
FIG. 3 is a schematic view of a first insulating film according to an exemplary embodiment of the disclosure.

Further, as shown in FIG. 2, the insulating film assembly provided by the embodiments of the disclosure may further include the conductive layer 200. The conductive layer 200 is disposed between the first insulating film 110 and the second insulating film 120, and the conductive layer 200 includes a circuit board 220. The second buffering via 121 is located on one end of the second orthographic projection region 123 away from the circuit board 220, and/or the second buffering via 121 is located on one end of the second orthographic projection region 123 close to the circuit board 220.

Components of the insulating film assembly provided by the embodiments of the disclosure are described in detail as follows.

The first insulating film 110 and the second insulating film 120 are opposite to each other, and the first insulating film 110 and the second insulating film 120 are connected to each other by thermocompression. The conductive layer 200 is disposed between the first insulating film 110 and the second insulating film 120. The conductive layer 200 may include the circuit board 220 and the busbar 210. The circuit board 220 is covered by the first insulating film 110 and the second insulating film 120, and a portion of the busbar 210 connected to the battery is exposed to the first insulating film 110 and the second insulating film 120. That is, the first insulating film 110 and the second insulating film 120 have openings at the portion where the busbar 210 is connected.

The first insulating film 110 may be a thermocompression insulating film, and the second insulating film 120 may be a thermocompression insulating film. The first insulating film 110 and the second insulating film 120 may be laminated with the busbar 210 and the circuit board 220 through a thermocompression process to form the insulating film assembly 10. For instance, the material of the thermocompression film may be one or more of ethylene phthalate (PET), polyethylene terephthalate-polyethylene glycol (PETG), thermoplastic polyurethane (TPU), polycarbonate (PC), polypropylene (PP), and the like.

Figure 4:
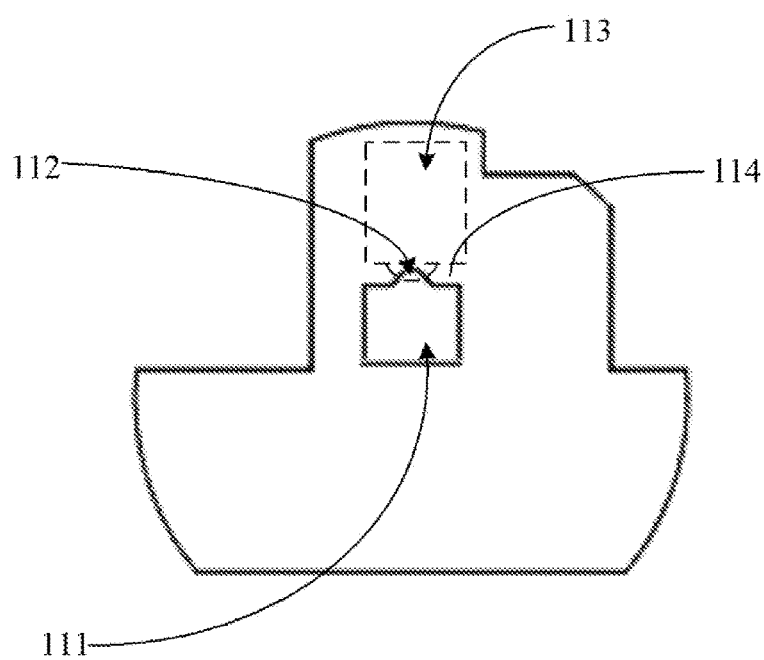
FIG. 4 is a partial enlarged view of the first insulating film of the first type according to an exemplary embodiment of the disclosure.
Figure 9:
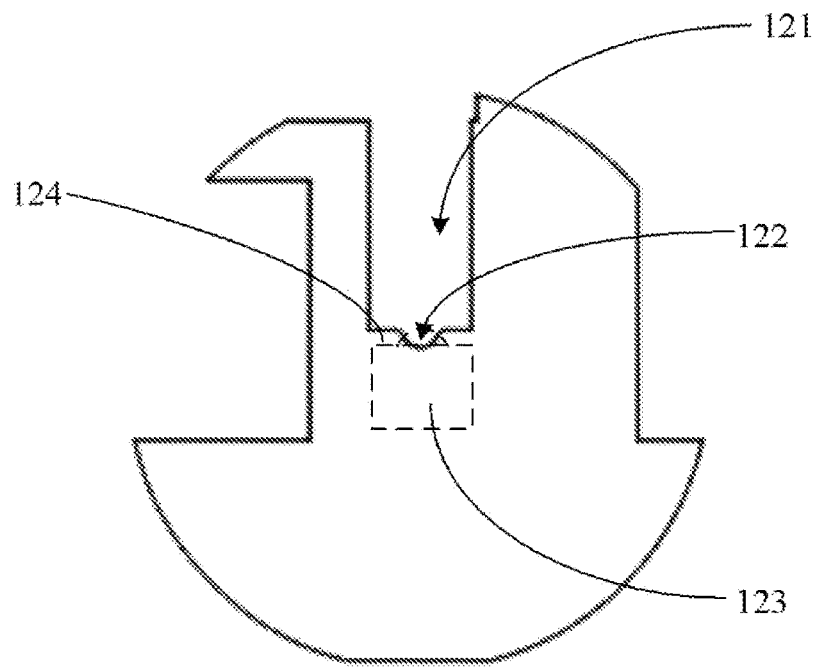
FIG. 9 is a partial enlarged view of the second insulating film of the first type according to an exemplary embodiment of the disclosure.

In a practical embodiment, as shown in FIG. 4, the first insulating film 110 is provided with a first spacing region 114, the first spacing region 114 is located between the first buffering via 111 and the first orthographic projection region 113, and the first buffering groove 112 is at least partially located in the first spacing region 114. As shown in FIG. 9, the second insulating film 120 is provided with a second spacing region 124, the second spacing region 124 is located between the second buffering via 121 and the second orthographic projection region 123, and the second buffering groove 122 is at least partially located in the second spacing region 124. The first spacing region 114 and the second spacing region 124 may be connected to each other through thermocompression and the like.

Exemplarily, a width of the first spacing region 114 may be 1 mm to 3 mm, that is, a distance between the first buffering via 111 and the first orthographic projection region 113 is 1 mm to 3 mm. A width of the second spacing region 114 may be 1 mm to 3 mm, that is, a distance between the second buffering via 111 and the second orthographic projection region 113 is 1 mm to 3 mm.

By arranging the first spacing region 114 between the first buffering via 111 and the first orthographic projection region 113 and arranging the second spacing region 124 between the second buffering via 121 and the second orthographic projection region 123, a double-layered film is formed in the overlapping region. A third buffering via 11 is formed in the double-layered film region through the first buffering groove 112 and the second buffering groove 122, and in this way, the direction of buffering and tearing may be guided, and the tearing direction may be easily controlled. Further, the first insulating film 110 and the second insulating film 120 may be connected by the first spacing region 114 and the second spacing region 124, and foreign objects are prevented from entering the battery apparatus from between the first insulating film 110 and the second insulating film 120.

Herein, the first buffering via 111 may be a via on the first insulating film 110. For instance, the first buffering via 111 may be a rectangular via, an oval via, a circular via, a special-shaped via, or the like on the first insulating film 110. The second buffering via 121 may be a via on the second insulating film 120. For instance, the second buffering via 121 may be a rectangular via, an oval via, a circular via, a special-shaped via, or the like on the second insulating film 120.

Exemplarily, the first buffering via 111 is a rectangular via on the first insulating film 110, and the second buffering via 121 is a rectangular via on the second insulating film 120. Widths of the first buffering via 111 and the second buffering via 121 are the same. On the first insulating film 110, the first buffering via 111 is located on one end of the first orthographic projection region 113. That is, the first buffering via 111 and the second buffering via 121 are arranged in a length direction of the first buffering via 111. Herein, both the first spacing region 114 and the second spacing region 124 are rectangular, and orthographic projections of the first spacing region 114 and the second spacing region 124 overlap, forming a double-layered overlapping region.

An orthographic projection of a terminal end of the first buffering groove 112 on the second insulating film 120 is located in the second buffering groove 122 or in the second buffering via 121, and the terminal end of the first buffering groove 112 is one end of the first buffering groove 112 away from the first buffering via 111.

Herein, the orthographic projection of the terminal end of the first buffering groove 112 on the second insulating film 120 located in the second buffering via 121 means that the first buffering groove 112 may extend from the edge of the first buffering via 111 close to the first orthographic projection region 113 to the edge of the first spacing region 114 away from the first buffering via 111 or may extend to the first orthographic projection region 113.

An orthographic projection of a terminal end of the second buffering groove 122 on the first insulating film 110 is located in the first buffering groove 112 or in the first buffering via 111, and the terminal end of the second buffering groove 122 is one end of the second buffering groove 122 away from the second buffering via 121.

Herein, the orthographic projection of the terminal end of the second buffering groove 122 on the first insulating film 110 located in the first buffering via 111 means that the second buffering groove 122 may extend from the edge of the second buffering via 121 close to the second orthographic projection region 123 to the edge of the second spacing region 124 away from the second buffering via 121 or may extend to the second orthographic projection region 123.

In another practical embodiment of the disclosure, the edge of the first buffering via 111 and the edge of the first orthographic projection region 113 overlap in the first insulating film 110, and the edge of the second buffering via 121 and the edge of the second orthographic projection region 123 overlap in the second insulating film 120. That is, in the insulating film assembly, the first buffering via 111 and the second buffering via 121 are complementary.

Herein, the first buffering groove 112 is arranged at the edge of the first buffering via 111 close to the first orthographic projection region 113, and the second buffering groove 122 is arranged at the edge of the second buffering via 121 close to the second orthographic projection region 123. The orthographic projection of the first buffering groove 112 on the second insulating film 120 overlaps with the edge of the second buffering groove 122, and the first buffering groove 112 and the second buffering groove 122 form the third buffering via 11.

The orthographic projection region of the first buffering groove 112 on the second insulating film 120 is located in the second buffering via 121, and the orthographic projection region of the second buffering groove 122 on the first insulating film 110 is located in the first buffering via 111. That is, vias penetrating the insulating film assembly are formed at the first buffering groove 112 and the second buffering groove 122, and the vias are used to guide the tearing direction when the insulating film assembly is torn.

The first buffering groove 112 may be arranged at the edge of the first buffering via 111 close to the first orthographic projection region 113, and the first buffering groove 112 penetrates the first insulating film 110. The width of the first buffering groove 112 is less than the width of the first buffering via 111. The second buffering groove 122 may be arranged at the edge of the second buffering via 121 close to the second orthographic projection region 123, and the second buffering groove 122 penetrates the second insulating film 120. The width of the second buffering groove 122 is less than the width of the second buffering via 121.

In the embodiments of the disclosure, the width of the first buffering groove 112 decreases in a direction close to the terminal end, and the width of the second buffering groove 122 decreases in a direction close to the terminal end. For instance, the first buffering groove 112 may be a semicircular groove, a waist-shaped groove, a triangular groove, or the like. The second buffering groove 122 may be a semicircular groove, a waist-shaped groove, a triangular groove, or the like. The tearing direction of the insulating film may be effectively controlled.

Herein, a starting end of the first buffering groove 112 is located at the edge of the first buffering via 111, and the terminal end of the first buffering groove 112 is located inside the first insulating film 110. The direction from the starting end to the terminal end of the first buffering groove 112 is a first direction, and the width of the first buffering groove 112 is the dimension of the first buffering groove 112 in a second direction. A starting end of the second buffering groove 122 is located at the edge of the second buffering via 121, and the terminal end of the second buffering groove 122 is located inside the second insulating film 120. The direction from the starting end to the terminal end of the second buffering groove 122 is the first direction, and the width of the second buffering groove 122 is the dimension of the first buffering groove 112 in the second direction. The first direction is perpendicular to the battery arrangement direction, and the second direction is perpendicular to the first direction. The first direction is the tearing direction and is perpendicular to the battery arrangement direction, good buffering effect is thereby provided, and the service life of the battery apparatus is improved.

The first buffering groove 112 is an arc-shaped notch arranged at the edge of the first buffering via 11, and/or the second buffering groove 122 is an arc-shaped notch arranged at the edge of the second buffering via 121. For instance, the first buffering groove 112 has a semi-circular arc shape, and the second buffering groove 122 has a semi-circular arc shape. The first buffering groove 112 and the second buffering groove 122 are arc-shaped, and the tearing resistance of the first buffering groove 112 and the second buffering groove 122 may thus be improved.

Figure 6:
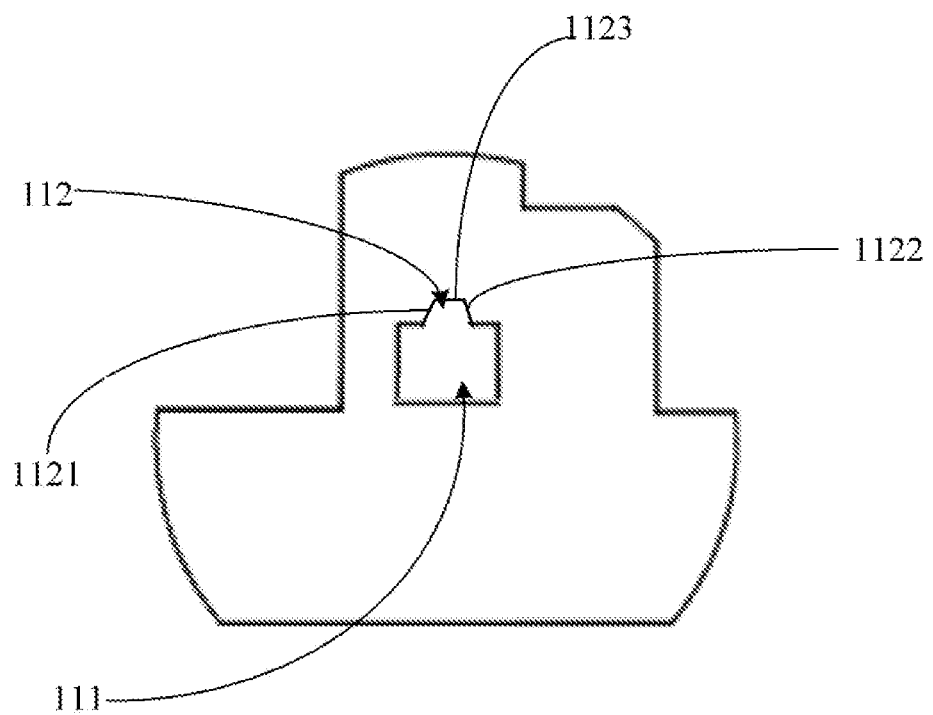
FIG. 6 is a partial enlarged view of the first insulating film of the third type according to an exemplary embodiment of the disclosure.
Figure 11:
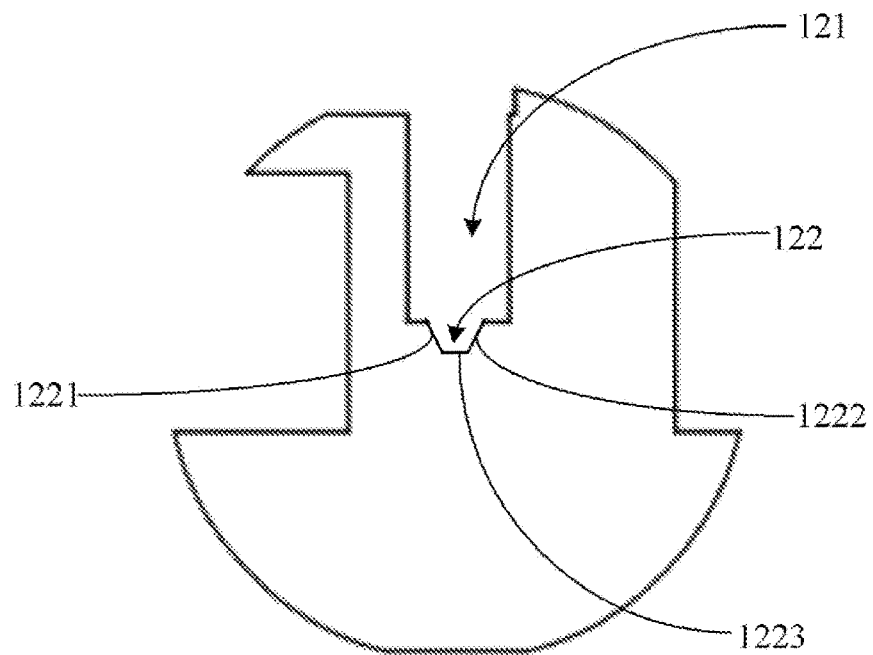
FIG. 11 is a partial enlarged view of the second insulating film of the third type according to an exemplary embodiment of the disclosure.

Alternatively, as shown in FIG. 6, the first buffering groove 112 has a linear structure, and the width of the terminal end of the first buffering groove 112 is greater than 0. As shown in FIG. 11, the second buffering groove 122 has a linear structure, and the width of the terminal end of the second buffering groove 122 is greater than 0.

Herein, the width of the terminal end of the first buffering groove 112 is greater than 0, that is, the terminal end of the first buffering groove 112 is not sharp, so that stress concentration may be avoided, and the tearing resistance of the first buffering groove 112 is improved. The width of the terminal end of the second buffering groove 122 is greater than 0, that is, the terminal end of the second buffering groove 122 is not sharp, so that stress concentration may be avoided, and the tearing resistance of the second buffering groove 122 is improved.

A terminal end portion of the first buffering groove 112 has a first side 1121, a second side 1122, and an end side 1123. The first side 1121 is a line segment, the second side 1122 is a line segment, and the end side 1123 is a line segment in the first buffering groove 112. One end of the end side 1123 is connected to one end of the first side 1121 close to the terminal end of the first buffering groove 112, and the other end of the end side 1123 is connected to one end of the second side 1122 close to the terminal end of the first buffering groove 112, such that the end side 1123 forms the terminal end of the first buffering groove 112. The terminal end portion of the first buffering groove 112 is a section of a predetermined length close to the terminal end in the first buffering groove 122.

Further/alternatively, a terminal end portion of the second buffering groove 122 has a first side 1221, a second side 1222, and an end side 1223. The first side 1221 is a line segment, the second side 1222 is a line segment, and the end side 1223 is a line segment in the second buffering groove 122. One end of the end side 1223 is connected to one end of the first side 1221 close to the terminal end of the second buffering groove 122, and the other end of the end side 1223 is connected to one end of the second side 1222 close to the terminal end of the second buffering groove 122, such that the end side 1223 forms the terminal end of the second buffering groove 122. The terminal end portion of the second buffering groove 122 is a section of a predetermined length close to the terminal end in the second buffering groove 122.

Herein, the terminal end portion of the of the first buffering groove 112 refers to a section of the first buffering groove 112 close to the terminal end, and the side of the first buffering groove 112 may include at least one line segment. That is, the side of the first buffering groove may be straight or folded. The terminal end portion of the of the second buffering groove 122 refers to a section of the second buffering groove 122 close to the terminal end, and the side of the second buffering groove 122 may include at least one line segment. That is, the side of the second buffering groove may be straight or folded.

Exemplarily, the first buffering groove 112 is a trapezoidal notch disposed at the edge of the first buffering via 111. The first buffering groove 112 has the first side 1121 (one leg of the trapezoid), the second side 1122 (the other leg of the trapezoid) and the end side 1123 (the upper base of the trapezoid). The end side 1123 is a line segment, and the end side 1123 forms the terminal end of the first buffering groove 112. The first side 1121 and the second side 1122 are connected to two ends of the end side 1123 and extend from the end side 1123 to the first buffering via 111, and the distance between the first side 1121 and the second side 1122 decreases in a direction close to the terminal end.

The second buffering groove 122 is a trapezoidal notch disposed at the edge of the second buffering via 121. The second buffering groove 122 has the first side 1221 (one leg of the trapezoid), the second side 1222 (the other leg of the trapezoid) and the end side 1223 (the upper base of the trapezoid). The end side 1223 is a linear structure, and the end side 1223 forms the terminal end of the second buffering groove 122. The first side 1221 and the second side 1222 are connected to two ends of the end side 1223 and extend from the end side to the second buffering via 121, and the distance between the first side 1221 and the second side 1222 decreases in a direction close to the terminal end.

Figure 5:
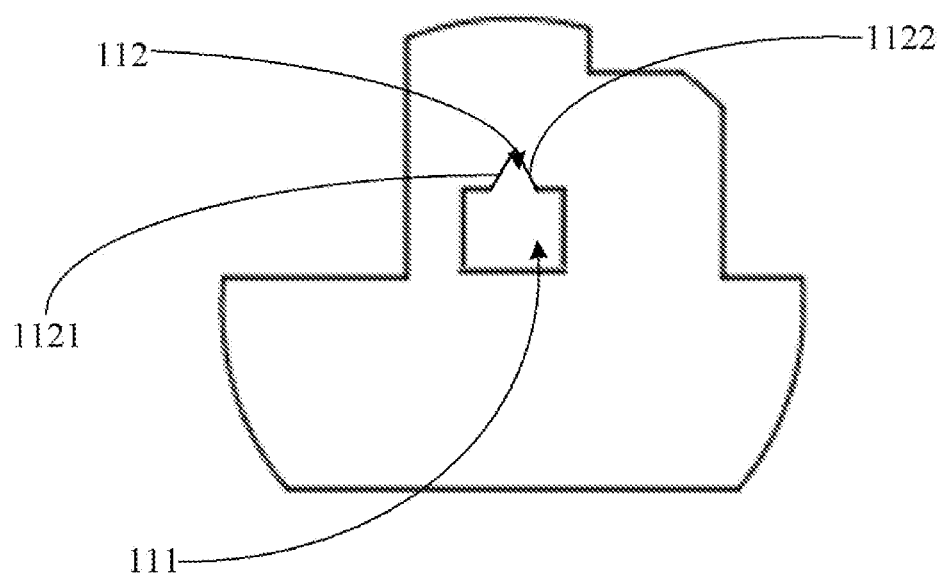
FIG. 5 is a partial enlarged view of the first insulating film of the second type according to an exemplary embodiment of the disclosure.
Figure 10:
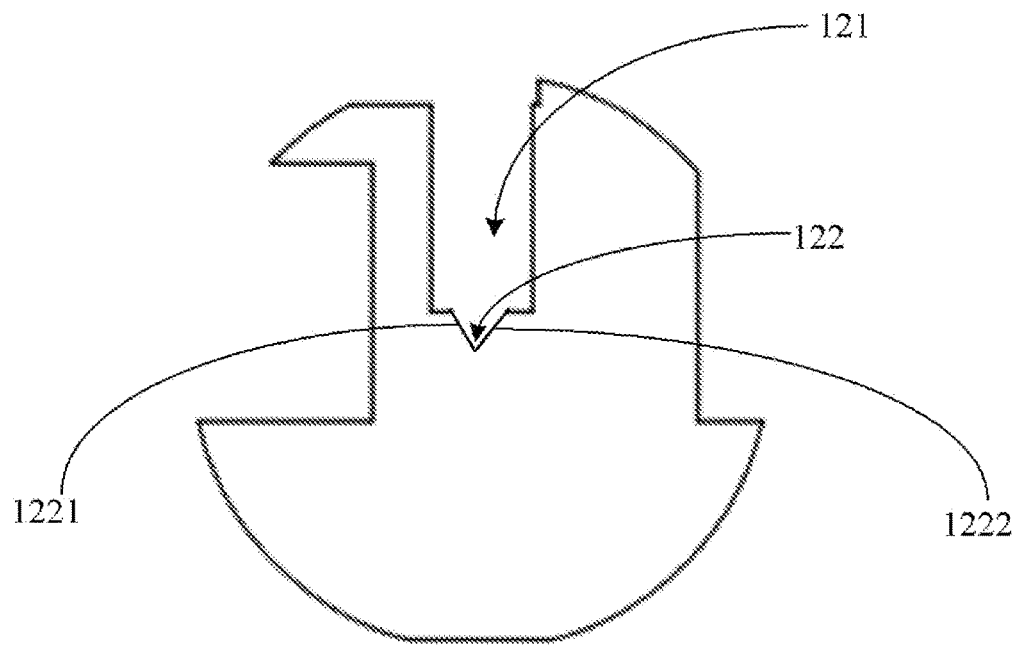
FIG. 10 is a partial enlarged view of the second insulating film of the second type according to an exemplary embodiment of the disclosure.

Alternatively, as shown in FIG. 5, the first buffering groove 112 has a linear structure, and the width of the terminal end of the first buffering groove 112 is equal to 0. As shown in FIG. 10, the second buffering groove 122 has a linear structure, and the width of the terminal end of the second buffering groove 122 is equal to 0. That is, the terminal end of the first buffering groove 112 is a sharp corner, and the terminal end of the second buffering groove 122 is a sharp corner.

By setting the terminal end of the first buffering groove 112 as a sharp corner and setting the terminal end of the second buffering groove 122 as a sharp corner, the first buffering groove 112 and the second buffering groove 122 may be easily torn. Further, the tearing direction is determined by the orientation of the sharp corners, so that the tearing direction may be easily controlled.

The terminal end portion of the first buffering groove 112 has the first side 1121 and the second side 1122. The first side 1121 is a line segment and the second side 1122 is a line segment in the first buffering groove 112. The terminal end of the first side 1121 is connected to the terminal end of the second side 1122 to form the terminal end of the first buffering groove 112. The terminal end portion of the first buffering groove 112 is a section of a predetermined length close to the terminal end in the first buffering groove 112.

Further/alternatively, the terminal end portion of the second buffering groove 122 has the first side 1221 and the second side 1222. The first side 1221 is a line segment and the second side 1222 is a line segment in the second buffering groove 122. The terminal end of the first side 1221 is connected to the terminal end of the second side 1222 to form the terminal end of the second buffering groove 122. The terminal end portion of the second buffering groove 122 is a section of a predetermined length close to the terminal end in the second buffering groove 122.

Herein, the terminal end portion of the of the first buffering groove 112 refers to a section of the first buffering groove 112 close to the terminal end, and the side of the first buffering groove 112 may include at least one line segment. That is, the side of the first buffering groove 112 may be straight or folded. The terminal end portion of the of the second buffering groove 122 refers to a section of the second buffering groove 122 close to the terminal end, and the side of the second buffering groove 122 may include at least one line segment. That is, the side of the second buffering groove 122 may be straight or folded.

Exemplarily, the first buffering groove 112 has the first side 1121 and the second side 1122. The first side 1122 and the second side 1122 extend from the edge of the first buffering via 111 to a direction away from the first buffering via 111. The first side 1121 and the second side 1122 intersect at the terminal end of the first buffering groove 112, and the distance between the first side 1121 and the second side 1122 decreases in a direction close to the terminal end.

The second buffering groove 122 has the first side 1221 and the second side 1222. The first side 1221 and the second side 1222 extend from the edge of the second buffering via 121 to a direction away from the second buffering via 121. The first side 1221 and the second side 1222 intersect at the terminal end of the second buffering groove 122, and the distance between the first side 1221 and the second side 1222 decreases in a direction close to the terminal end.

Certainly, in practical application, the first buffering groove 112 and the second buffering groove 122 may have other structures. Exemplarily, the first buffering groove 112 may include a first groove body and a first end portion, the first groove body is connected to the first end portion, and the first end portion is located on a side of the groove body close to the terminal end of the first buffering groove 112. The first groove body extends from the edge of the first buffering via 111 to the end portion, the width of the first groove body is unchanged, and the width of the first end portion decreases in the direction close to the terminal end of the first buffering groove 112. For instance, the first groove body may be a rectangular structure, and the first end portion may be a circular arc or a sharp corner. The second buffering groove 122 may include a second groove body and a second end portion, the second groove body is connected to the second end portion, and the second end portion is located on a side of the groove body close to the terminal end of the second buffering groove 122. The second groove body extends from the edge of the second buffering via 121 to the terminal end of the second buffering groove 122, the width of the second groove body is unchanged, and the width of the second end portion decreases in the direction close to the terminal end. For instance, the second groove body may be a rectangular structure, and the second end portion may be a circular arc or a sharp corner.

In the embodiments of the disclosure, the insulating film assembly may be provided with a buffering region. The first buffering via 111 may be disposed on the first insulating film 110 at a position corresponding to the buffering region, and the second buffering via 121 may be disposed on the second insulating film 120 at a position corresponding to the buffering region. The insulating film assembly may be provided with a plurality of buffering regions, and one buffering region may be provided with at least one first buffering via 111 and at least one second buffering via 121.

Exemplarily, as shown in FIG. 13, FIG. 14, FIG. 15, and FIG. 16, the buffering region may be provided with two second buffering vias 121 and one first buffering via 111 The second insulating film 120 is provided with a separation region 125. Two sides of the separation region 125 are provided with the second buffering vias 121, and the orthographic projection of the first buffering via 111 on the second insulating film 120 is located in the separation region 125.

Herein, when two sides of the separation region 125 are provided the second buffering vias 121, the two sides of the separation region 125 are provided with the second buffering grooves 122, and each second buffering groove 122 is connected to the corresponding second buffering via 121. The first buffering via 111 is arranged in the orthographic projection region of the separation region 125 on the first insulating film 110, and two sides of the first buffering via 111 are provided with the second buffering grooves 122. For instance, the terminal ends of the second buffering grooves 122 on two sides of the separation region 125 are arranged to be opposite to each other, and the second buffering grooves 122 may be arranged in the middle of the separation region 125, so that herein, the separation region 125 forms a "dumbbell" like structure and thus has low strength and may be easily torn.

The conductive layer 200 is arranged between the first insulating film 110 and the second insulating film 120, and the conductive layer 200 includes the circuit board 220 and the busbar 210. The second buffering via 121 is located on one end of the second orthographic projection region 123 away from the circuit board 220, and/or the second buffering via 121 is located on one end of the second orthographic projection region 123 close to the circuit board 220. That is, the first buffering via 111 and the second buffering via 121 are arranged in a direction perpendicular to the length direction of the circuit board.

Herein, the orthographic projection of the first buffering via 111 on the surface of the conductive layer 200 may or may not partially overlap with the circuit board 220 and the busbar 210. The orthographic projection of the second buffering via 121 on the surface of the conductive layer 200 may or may not partially overlap with the circuit board 220 and the busbar 210. The orthographic projection of the first buffering groove 112 on the surface of the conductive layer 200 may or may not partially overlap with the circuit board 220 and the busbar 210. The orthographic projection of the second buffering groove 122 on the surface of the conductive layer 200 may or may not partially overlap with the circuit board 220 and the busbar 210.

The conductive layer 200 may include at least one row of busbars 210, one row of busbars 210 includes a plurality of busbars 210, and the busbars 210 are arranged in the length direction of the circuit board 220. For instance, the conductive layer 200 may include two rows of busbars 210, and the two rows of busbars 210 are disposed on two sides of the circuit board 220. The first buffering via 111 and the second buffering via 121 may be disposed between two adjacent busbars 210 in a row of busbars 210.

The first buffering via 111 and the first orthographic projection region 113 are arranged in the first direction, the first direction is perpendicular to the second direction, and the second direction is the battery arrangement direction. That is, the second buffering via 121 and the first buffering via 111 are arranged in the first direction, and this arrangement direction is perpendicular to the battery arrangement direction. A row of busbars 210 is arranged in the second direction.

Figure 17:
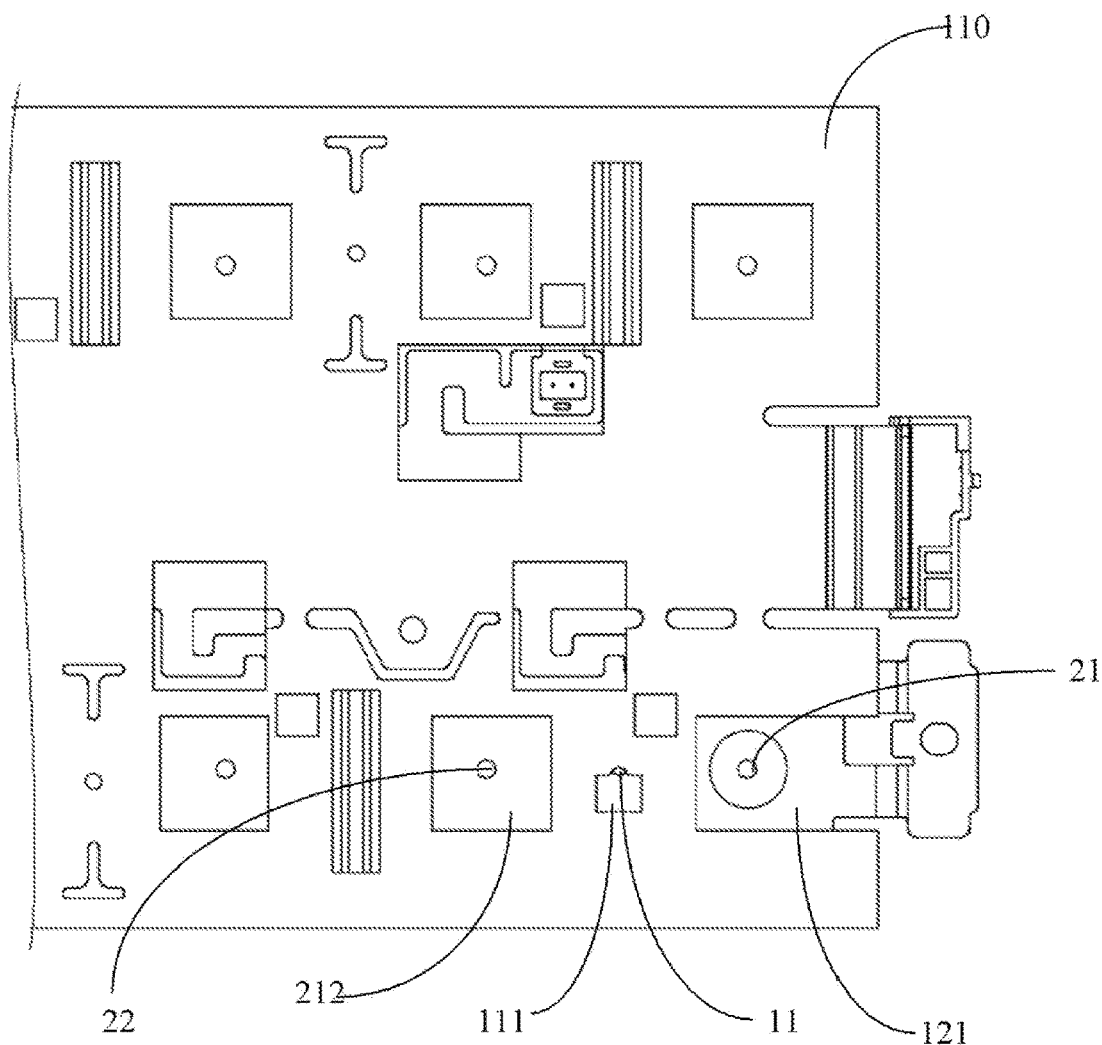
FIG. 17 is a partial schematic view of the insulating film assembly according to an exemplary embodiment of the disclosure.

Exemplarily, as shown in FIG. 17, a third spacing region is provided between a first busbar 211 and a second busbar 212. The first buffering via 111 is located in an orthographic projection region of the third spacing region on the first insulating film 110, and the second buffering via 121 is located in an orthographic projection region of the third spacing region on the second insulating film 120. The first busbar 211 and the second busbar 212 are any two adjacent busbars 210 in one row of busbars 210.

Herein, one row of busbars 210 includes plural busbars 210, that is, the insulating film assembly has a plurality of third spacing regions. In the embodiments of the disclosure, each third spacing region may be provided with the first buffering via 111 and the second buffering via 121, or one or part of the third spacing regions among the third spacing regions may be provided with the first buffering via 111 and the second buffering via 121, which is not particularly limited in the embodiments of the disclosure.

Between the first busbar 211 and the second busbar 212, the first buffering groove 112 and the second buffering groove 122 form third buffering vias 11 penetrating the insulating film assembly. At least one of the third buffering vias 11 in the insulating film assembly is located between a welding region of the first busbar 211 and a welding region of the second busbar 212.

In the battery apparatus, the busbar 210 is welded to the corresponding post terminal. The connection strength between the insulating film assembly and the battery is the greatest at the welding region of the busbar 210, and stress concentration is easily generated when the busbar 210 and the post terminal are welded. During the use of the battery, the stress in this region is relatively concentrated when the battery is swelled. By arranging the third buffering via 11 between the welding region of the first busbar 211 and the welding region of the second busbar 212, the stress may be relieved.

One third buffering via 11 is provided between the first busbar 211 and the second busbar 212, and the distance between the third buffering via 11 and the first busbar 211 and the distance between the third buffering via 11 and the second busbar 212 are the same. The first busbar 211 is provided with a first positioning hole 21, and the second busbar 212 is provided with a second positioning hole 22. The first positioning hole 21, the third buffer via 11, and the second positioning hole 22 are located on a straight line.

By arranging the first positioning hole 21, the second positioning hole 22, and the third buffering via 11 to be located on a straight line, processing and positioning may be conveniently performed on the one hand, good buffering effect may be provided on the other hand, and external foreign objects may be prevented from entering.

The first positioning hole 21, the second positioning hole 22, and the third buffering via 11 may all be round holes. Herein, the first positioning hole 21, the third buffering via 11, and the second positioning hole 22 located on a straight line means that the centers of the first positioning hole 21, the second positioning hole 22, and the third buffering via 11 are collinear. Certainly, in practical applications, the first positioning hole 21, the second positioning hole 22, and the third buffering via 11 may also be holes of other shapes, such as diamond holes or oval holes, and the embodiments of the disclosure are not limited thereto.

Figure 7:
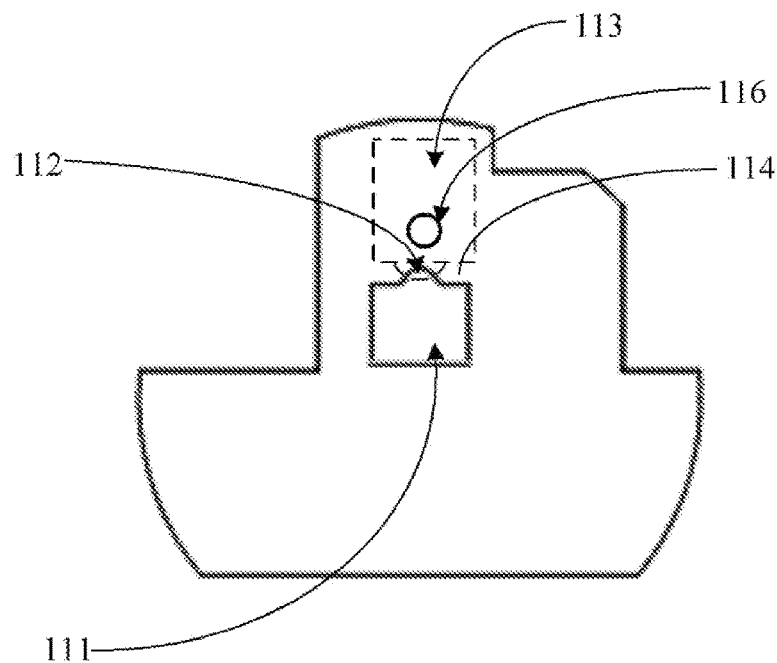
FIG. 7 is a partial enlarged view of the first insulating film of the fourth type according to an exemplary embodiment of the disclosure.
Figure 8:
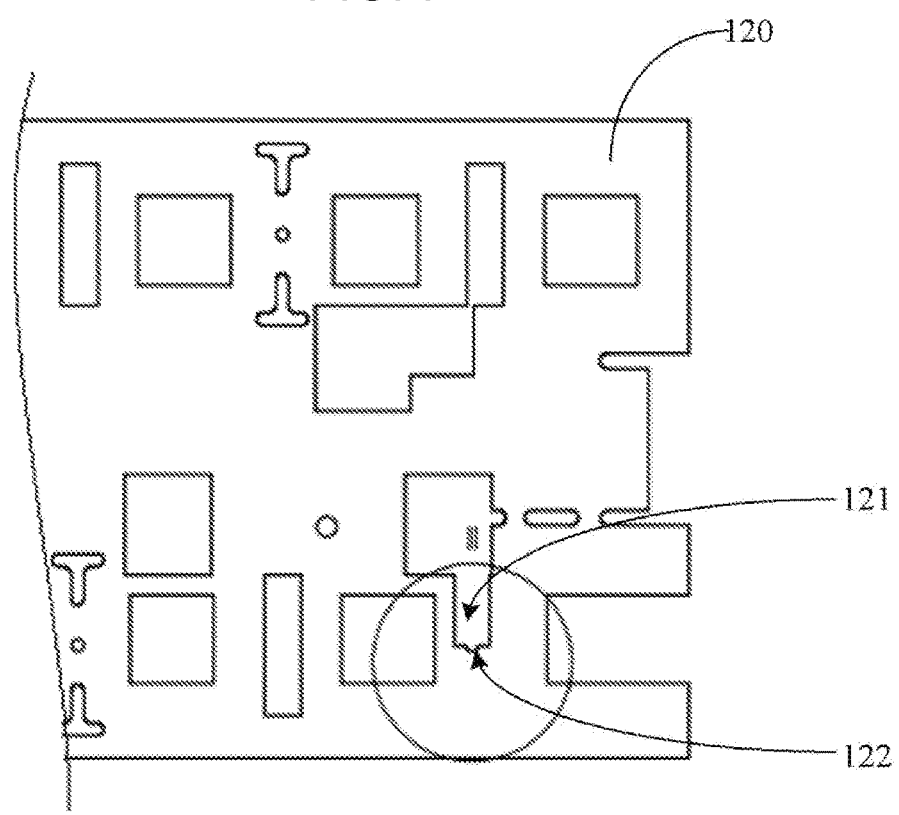
FIG. 8 is a schematic view of a second insulating film according to an exemplary embodiment of the disclosure.
Figure 12:
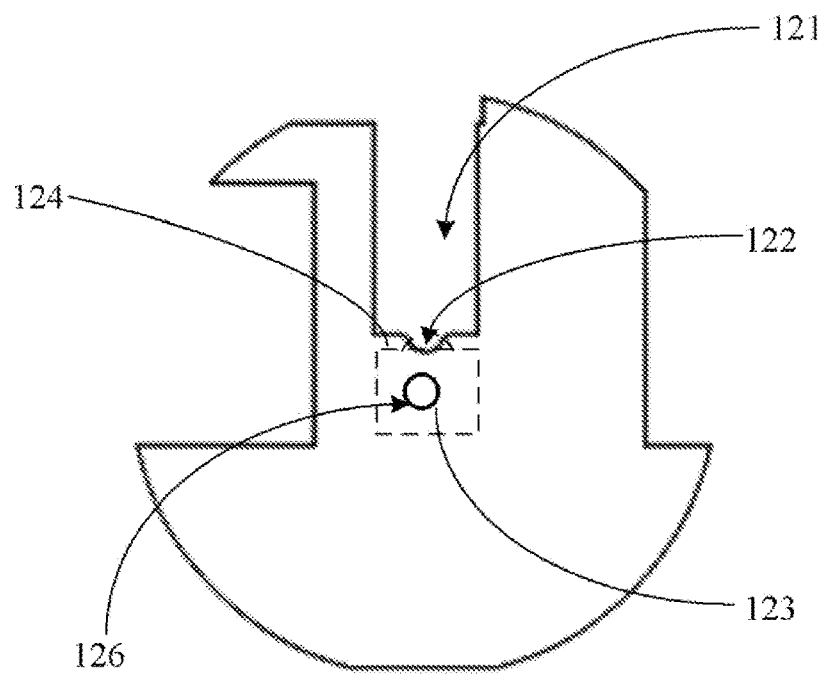
FIG. 12 is a partial enlarged view of the second insulating film of the fourth type according to an exemplary embodiment of the disclosure.
Figure 13:
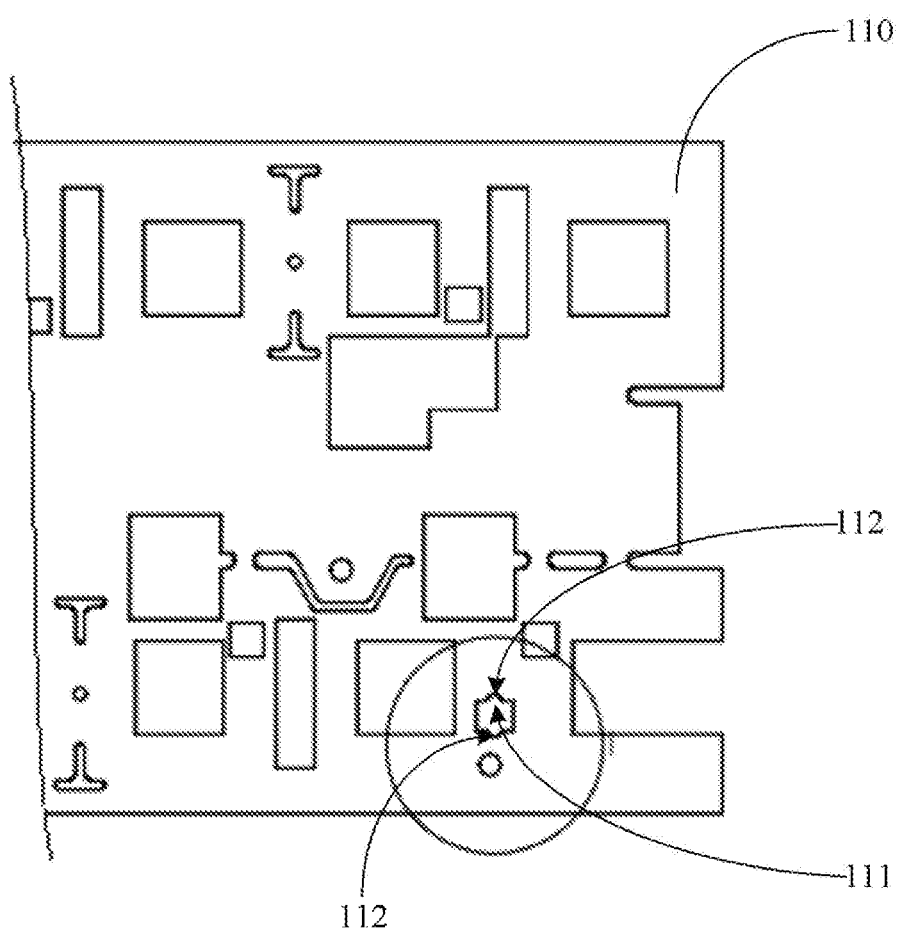
FIG. 13 is a schematic view of the first insulating film of another type according to an exemplary embodiment of the disclosure.
Figure 14:
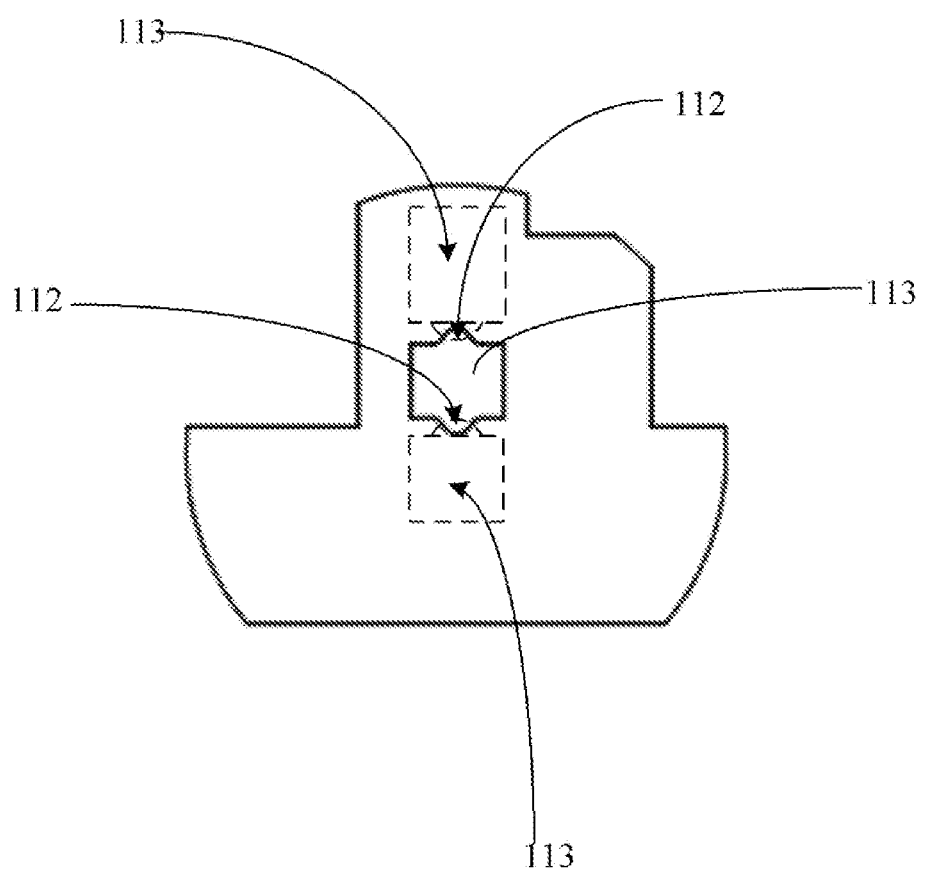
FIG. 14 is a partial enlarged view of the first insulating film of the fifth type according to an exemplary embodiment of the disclosure.
Figure 15:
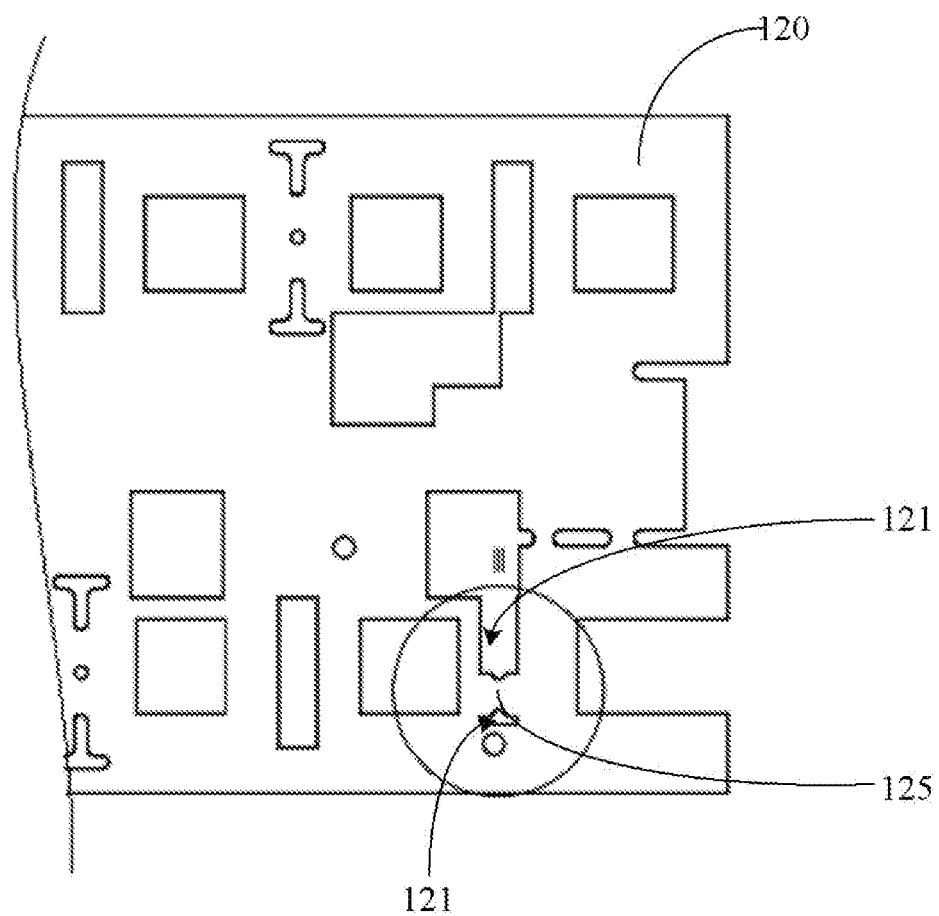
FIG. 15 is a schematic view of the second insulating film of another type according to an exemplary embodiment of the disclosure.
Figure 16:
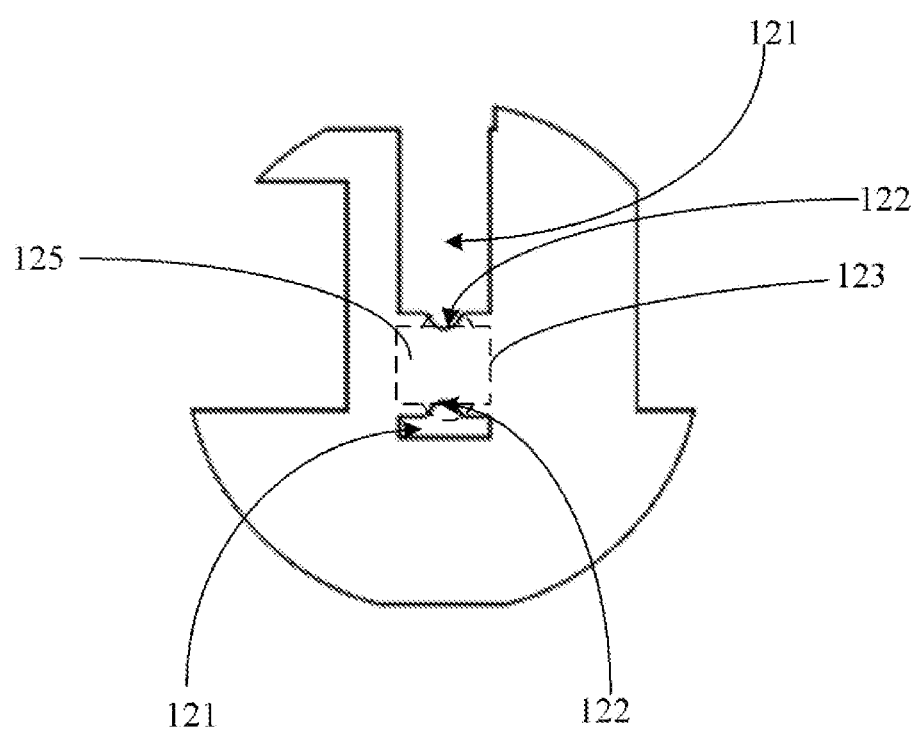
FIG. 16 is a partial enlarged view of the second insulating film of the fifth type according to an exemplary embodiment of the disclosure.

As shown in FIG. 7, the first insulating film 110 is provided with a first tear arresting hole 116, the first tear arresting hole 116 is located on one side of the terminal end of the first buffering groove 112, and a spacing is provided between the first tear arresting 116 hole and the first buffering groove 112. As shown in FIG. 12, the second insulating film 120 is provided with a second tear arresting hole 126, the second tear arresting hole 126 is located on one side of the terminal end of the second buffering groove 122, and a spacing is provided between the second tear arresting hole 126 and the second buffering groove 122.

In the embodiments of the disclosure, the first tear arresting hole 116 and the second tear arresting hole 126 are configured for tear arresting, and the first tear arresting hole 116 and the second tear arresting hole 126 may also be used to be connected to a module cover plate. A connection protrusion for connecting to the first tear arresting hole 116 and the second tear arresting hole 126 may be provided on the module cover plate.

Since the busbars 210 are welded to the post terminals of the battery at the positioning holes, the positioning holes of the two busbars 210 and their surrounding regions have high connection strength with the battery. By arranging the tear arresting holes between the two positioning holes, the connection strength of the module cover plate and the insulating film assembly is improved.

In the embodiments of the disclosure, the circuit board 220 may be a flexible printed circuit (FPC), a flexible flat cable (FFC), or a printed circuit board (PCB) and the like. The busbar 210 may be a copper bar or an aluminum bar or the like. The circuit board 220 is connected to the busbar 210. The circuit board 220 is configured to collect low-voltage signals on the busbar 210, such as control signals such as temperature signals and humidity signals, or the circuit board 220 may be configured to transmit high-voltage signals (signals from the battery). The circuit board 220 may be connected to a low-voltage support and outputs the low-voltage signals through the low-voltage support. The busbar 210 may be connected to a high-voltage support and inputs or outputs the high-voltage signals through the high-voltage support. The high-voltage support and the low-voltage support may be provided on an end plate.

It should be noted that, the orthographic projections and the orthographic projection regions described in the embodiments of the disclosure all refer to the orthographically orthographic projections or the orthographically orthographic projection regions.

In the insulating film assembly provided by the embodiments of the disclosure, by arranging the first buffering via 111 in the first insulating film 110, by arranging the second buffering via 121 on the second insulating film 120, and by not allowing the orthographic projection of the second buffering via 121 on the first insulating film 110 and the first buffering via 111 to have overlapping regions, single-layered film regions are formed on the insulating film assembly. The single-layered films exhibit good flexibility, may be easily torn, and provide good buffering effects, and that the safety of the battery apparatus may thus be improved. Moreover, arrangement of the first buffering groove 112 and the second buffering groove 122 between the first buffering via 111 and the second buffering via 121 may guide the tearing direction, and the tearing direction of the insulating film assembly may thus be easily controlled. Further, the area of the vias on the insulating film assembly may be reduced, and foreign objects are thereby prevented from entering the battery apparatus or the insulating film assembly.

The exemplary embodiments of the disclosure further provide a battery apparatus, and the battery apparatus includes the abovementioned insulating film assembly 10.

Figure 18:
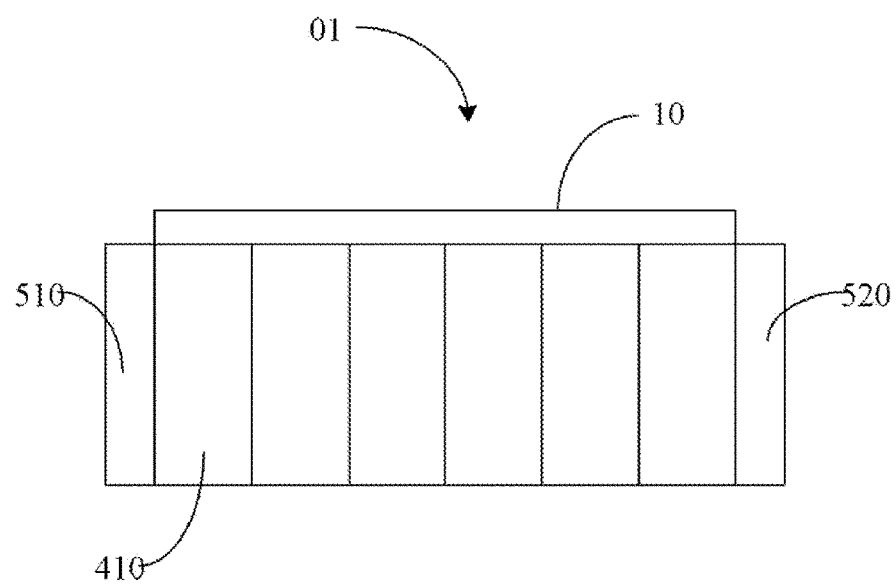
FIG. 18 is a schematic view of a battery module according to an exemplary embodiment of the disclosure.

In a practical embodiment, the battery apparatus may be a battery module 01. As shown in FIG. 18, the battery module 01 may include a battery group and the insulating film assembly 10, and the insulating film assembly 10 is disposed on a top surface of the battery group. The battery group includes a plurality of batteries 410 arranged in sequence. The insulating film assembly 10 includes an insulating film layer 100 and the conductive layer 200, and the insulating film layer 100 is connected to the conductive layer 200. The conductive layer 200 includes the busbar 210 and the circuit board 220, and the busbar 210 is configured to be connected to a post terminal 404 on the battery. The circuit board 210 is configured to be connected to the low-voltage support and is configured to transmit a control signal and the like. The insulating film layer covers the busbar 210 and the circuit board 220.

The battery group includes the batteries 410, and the batteries 410 are arranged in sequence. End plates are provided at both ends of the arrangement direction of the batteries 410, and the end plates are used to limit the positions of the plurality of batteries.

In the embodiments of the disclosure, the battery module 01 may further include end plates and side plates, a plurality of batteries form a battery group, and both ends of the battery group are provided with end plates. For instance, the battery module may include a first end plate 510 and a second end plate 520. The first end plate 510 and the second end plate 520 are disposed at two ends of the battery group, and the first end plate 510 and the second end plate 520 are configured for fixing the battery group.

Both sides of the battery group are provided with a first side plate and a second side plate (not shown). The first side plate is located on one side of the battery group, and two ends of the first side plate are connected to the first end plate 510 and the second end plate 520. The second side plate is located on another side of the battery group, and two ends of the second side plate are connected to the first end plate 510 and the second end plate 520. That is, the first end plate 510, the first side plate, the second end plate 520, and the second side plate are connected end to end in sequence to form a battery accommodating compartment, and the battery group is arranged in the battery accommodating compartment.

Figure 19:
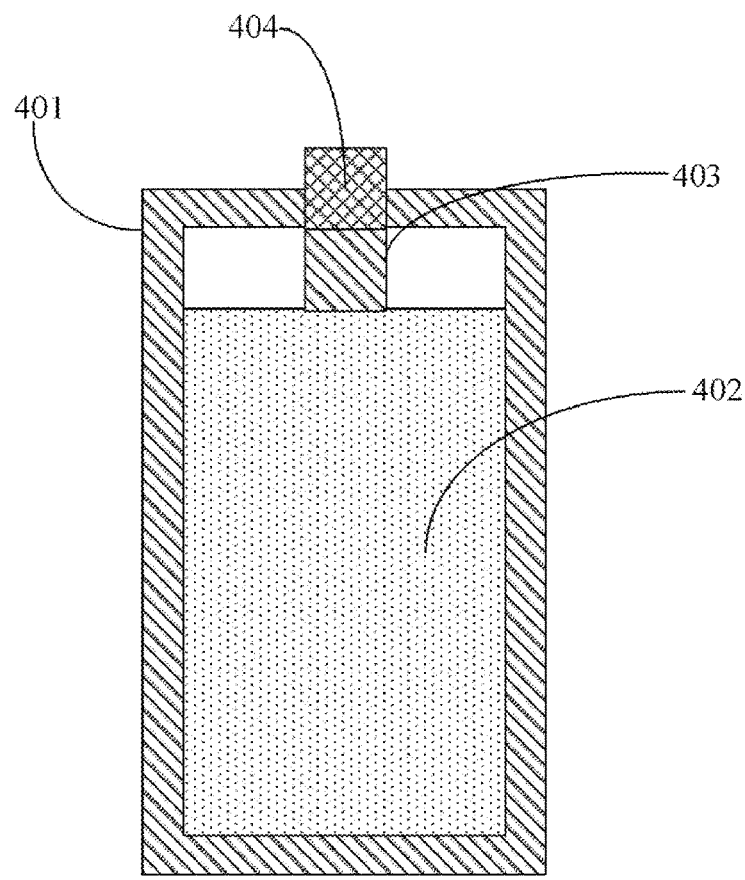
FIG. 19 is a schematic view of a battery according to an exemplary embodiment of the disclosure.

As shown in FIG. 19, the battery 410 may include a shell 401, a cell body 402, a tab 403, and a post terminal 404. The shell 401 has a cavity, and the cell body 402 is disposed in the cavity on the shell 401. The shell 401 may be formed by stamping or welding. The cavity in the shell 401 may be a closed cavity, and the cell body 402 is disposed in the closed cavity. The tab 403 is connected to the cell body 402, and the tab 403 protrudes from a top portion of the cell body 402. The tab 403 is configured to be connected the post terminal 404, and the post terminal 404 is disposed on a top surface of the shell 401.

Exemplarily, the shell 401 may be a rectangular cuboid or a thin-walled structure similar to a rectangular cuboid. The shell 401 may include a first shell and a second shell, and the first shell is a flat plate structure. The second shell is a cuboid cavity with an opening on one side, and the first shell is connected to the opening of the second shell. The first shell and the second shell may be connected by welding.

The opening of the second shell may be located on a top surface of the second shell, the first shell is connected to the second shell, and finally the top surface of the battery is formed by the first shell. The first shell may be provided with the post terminal 404, and the post terminal 404 is connected to the tab 403.

Optionally, the material of the shell 401 may be stainless steel or aluminum featuring good corrosion resistance and sufficient strength. Herein, the materials of the first shell and the second shell may be the same, or the materials of the first shell and the second shell may be different, which are not limited by the embodiments of the disclosure.

The post terminal 404 may be connected onto the first shell by means of bolting or welding. For instance, two vias may be provided on the first shell, and the two vias are disposed at positions of the first shell near the end portion.

The cell body 402 may be a laminated cell body or a wound cell body. When the cell body 402 is a laminated body, the cell body 402 has first electrode pieces that are stacked on each other, second electrode pieces that are electrically opposite to the first electrode pieces, and diaphragm pieces disposed between the first electrode pieces and the second electrode pieces. Therefore, multiple pairs of the first electrode pieces and the second electrode pieces are stacked to form the laminated cell.

Figure 20:
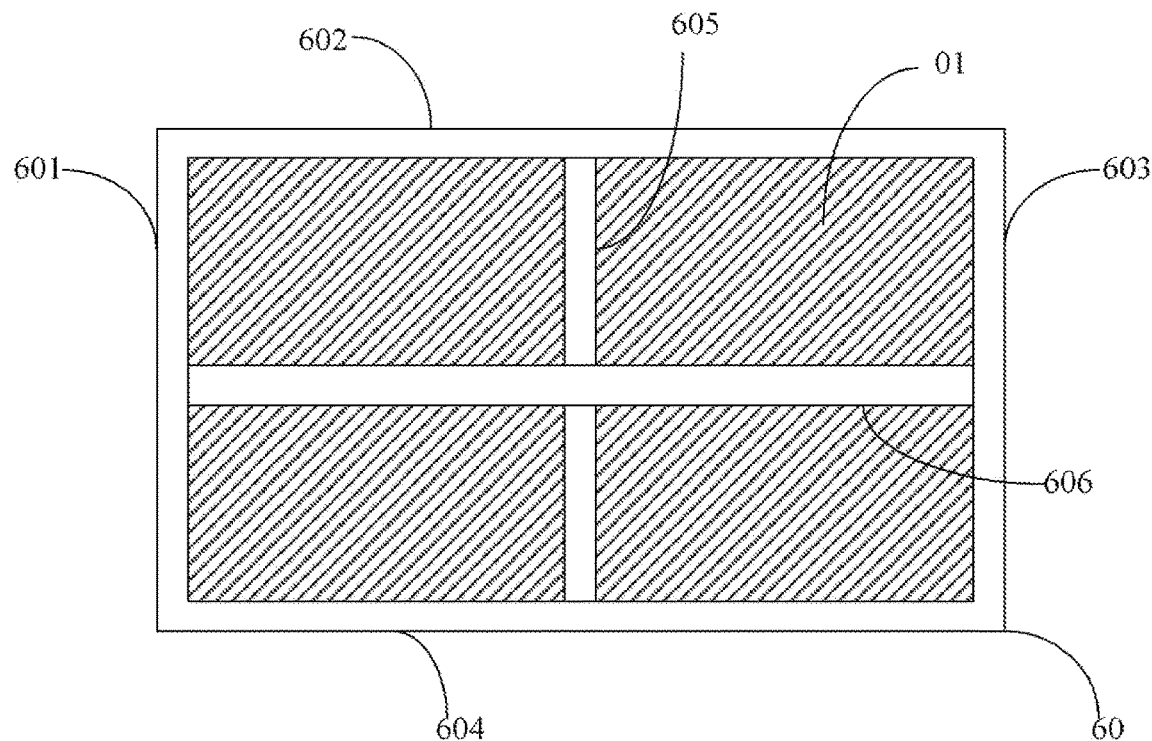
FIG. 20 is a schematic view of a battery pack according to an exemplary embodiment of the disclosure.

In another applicable embodiment, as shown in FIG. 20, the battery apparatus may be a battery pack, and the battery pack includes the insulating film assembly 10.

Further, the battery pack provided by the embodiments of the disclosure may further include a case body 60. The case body 60 may include a surrounding frame and an inner beam. The surrounding frame is a closed frame body, and the inner beam is arranged inside the surrounding frame and divides the space into a plurality of battery compartments. The inner beam may be connected to the surrounding frame, for example, the inner beam and the surrounding frame may be connected by welding, inserting, or bolting.

Herein, the battery pack may include the battery module 01, that is, the battery group, the end plates, and the insulating film assembly 10 form the battery module, and the battery module is disposed in the battery compartment.

Alternatively, the battery group is directly disposed in the battery compartment, and the insulating film assembly 10 is disposed in the battery group. Herein, placing the battery group directly in the battery compartment means that no end plate is provided at the end portion of the battery group, and the battery group is directly connected to or abuts against the surrounding frame or the inner beam.

The surrounding frame may be a rectangular frame, and the surrounding frame may include a first side beam 601, a second side beam 602, a third side beam 603, and a fourth side beam 604. The first side beam 601, the second side beam 602, the third side beam 603, and the fourth side beam 604 are connected end to end in sequence. The first side beam 601 and the third side beam 603 are arranged in parallel, and the second side beam 602 and the fourth side beam 604 are arranged in parallel.

The inner beam may include a horizontal beam 605 and a vertical beam 606. The inner beam is arranged inside the surrounding frame, and the inner beam and the surrounding frame are connected. The connection between the inner beam and the surrounding frame may be one or more of welding, inserting, glue connection, bolt connection, and connector connection.

Exemplarily, the horizontal beam 605 and the first side beam 601 are arranged in parallel, and two ends of the horizontal beam 605 are connected to the second side beam 602 and the fourth side beam 604. At least one horizontal beam 605 may be provided in the surrounding frame. When one horizontal beam 605 is provided in the surrounding frame, the horizontal beam 605 may be arranged in the middle of the first side beam 601 and the third side beam 603. When a plurality of horizontal beams 605 are provided in the surrounding frame, the horizontal beams 605 may be evenly distributed between the first side beam 601 and the third side beam 603.

The connection between the horizontal beam 605 and the second side beam 602 may be one or more of welding, inserting, glue connection, bolt connection, and connector connection. The connection between the horizontal beam 605 and the fourth side beam 604 may be one or more of welding, inserting, glue connection, bolt connection, and connector connection.

Exemplarily, the vertical beam 606 and the second side beam 602 are arranged in parallel, and the two ends of the horizontal beam 605 are connected to the first side beam 601 and the third side beam 603. At least one vertical beam 606 may be provided in the surrounding frame. When one vertical beam 606 is provided in the surrounding frame, the vertical beam 606 may be arranged in the middle of the second side beam 602 and the fourth side beam 604. When a plurality of vertical beams 606 are provided in the surrounding frame, the vertical beams 606 may be evenly distributed between the second side beam 602 and the fourth side beam 604.

The connection between the vertical beam 606 and the first side beam 601 may be one or more of welding, inserting, glue connection, bolt connection, and connector connection. The connection between the vertical beam 606 and the third side beam 603 may be one or more of welding, inserting, glue connection, bolt connection, and connector connection.

In an embodiment, both the surrounding frame and the internal beam may be hollow extruded profiles. For instance, the inner beam is a hollow aluminum alloy square tube, or the inner beam is a hollow stainless-steel square tube. In practical applications, in order to increase the strength of the inner beam, a reinforcement member may also be provided in the inner hollow cavity of the inner beam. For instance, a reinforcement rib may be provided in the hollow cavity of the inner beam, and the reinforcement rib is arranged in the length direction of the inner beam.

Further, the case body 60 provided by the embodiments of the disclosure may include a bottom plate, the bottom plate is configured to support the battery group. The surrounding frame is connected to the bottom plate, the surrounding frame and the bottom plate form an accommodating space, and the inner beam is arranged in the accommodating space formed by the surrounding frame and the bottom plate.

The bottom plate may be a rectangular plate, and the first side beam 601, the second side beam 602, the third side beam 603, and the fourth side beam 604 may be correspondingly connected to one side of the bottom plate. The first side beam 601, the second side beam 602, the third side beam 603, and the fourth side beam 604 may be provided on the upper surface of the bottom plate, or the first side beam 601, the second side beam 602, the third side beam 603, and the fourth side beam 604 may surround the bottom plate.

The upper surface of the bottom plate is used to carry the battery group, so the upper surface of the bottom plate is a flat surface. The battery group is in contact with the upper surface of the bottom plate. The flat surface can increase the contact area between the bottom plate and the battery, and stress concentration on the bottom plate, which may lead to local failure of the bottom plate, may also be prevented from occurring. Certainly, in practical applications, the bottom plate may only bear part of the gravity of the battery. The battery may be connected to the surrounding frame and the inner beam by means of glue connection, etc., and the surrounding frame and the inner beam may thus be configured to bear part of the gravity of the battery.

In the embodiments of the disclosure, the bottom plate, the surrounding frame, and the inner beam form a plurality of battery compartments in which battery groups are arranged, and each battery compartment may be provided with one or more battery groups.

The battery apparatus provided by the embodiments of the disclosure can be used in an electric vehicle, and the battery apparatus may be installed on the frame of the electric vehicle. The battery apparatus may be fixedly connected to the frame. Alternatively, the battery apparatus may be a modular battery pack, and the modular battery apparatus may be detachably connected to the vehicle body for easy replacement.

In the insulating film assembly provided by the embodiments of the disclosure, by arranging the first buffering via 111 in the first insulating film 110, by arranging the second buffering via 121 on the second insulating film 120, and by not allowing the orthographic projection of the second buffering via 121 on the first insulating film 110 and the first buffering via 111 to have overlapping regions, single-layered film regions are formed on the insulating film assembly. The single-layered films exhibit good flexibility, may be easily torn, and provide good buffering effects, and that the safety of the battery apparatus may thus be improved. Moreover, arrangement of the first buffering groove 112 and the second buffering groove 122 between the first buffering via 111 and the second buffering via 121 may guide the tearing direction, and the tearing direction of the insulating film assembly may thus be easily controlled. Further, the area of the vias on the insulating film assembly may be reduced, and foreign objects are thereby prevented from entering the battery apparatus or the insulating film assembly.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. An insulating film assembly, comprising:
   a first insulating film, wherein the first insulating film is provided with a first buffering via;
   a second insulating film, wherein the second insulating film and the first insulating film are opposite to each other, the second insulating film is provided with a second buffering via, an orthographic projection of the second buffering via on the first insulating film and the first buffering via do not have overlapping regions, such that a single-layered film structure is formed on a first orthographic projection region on the first insulating film and a single-layered film structure is formed on a second orthographic projection region on the second insulating film, the first orthographic projection region is an orthographic projection region of the second buffering via in the first insulating film, and the second orthographic projection region is an orthographic projection region of the first buffering via in the second insulating film; and
   a conductive layer, wherein the conductive layer is disposed between the first insulating film and the second insulating film, and the conductive layer comprises a busbar,
   wherein the first insulating film is further provided with a first buffering groove, the first buffering groove is located on a side of the first buffering via close to the first orthographic projection region, the first buffering groove communicates with the first buffering via, the second insulating film is further provided with a second buffering groove, the second buffering groove is located on a side of the second buffering via close to the second orthographic projection region, the second buffering groove communicates with the second buffering via, an orthographic projection region of the second buffering groove on the first insulating film at least partially overlaps with the first buffering groove, orthographic projections of the first buffering groove and the second buffering groove on the conductive layer at least partially do not overlap with the conductive layer, and orthographic projections of the first buffering via and the second buffering via on the conductive layer at least partially do not overlap with the conductive layer.

2. The insulating film assembly according to claim 1, wherein the first insulating film is provided with a first spacing region, the first spacing region is located between the first buffering via and the first orthographic projection region, and the first buffering groove is at least partially located in the first spacing region,
   the second insulating film is provided with a second spacing region, the second spacing region is located between the second buffering via and the second orthographic projection region, and the second buffering groove is at least partially located in the second spacing region.

3. The insulating film assembly according to claim 2, wherein the first buffering via and the first orthographic projection region are arranged in a first direction, the first direction is perpendicular to a second direction, and the second direction is a battery arrangement direction.

4. The insulating film assembly according to claim 1, wherein an orthographic projection of a terminal end of the first buffering groove on the second insulating film is located in the second buffering groove or in the second buffering via, and the terminal end of the first buffering groove is one end of the first buffering groove away from the first buffering via,
   an orthographic projection of a terminal end of the second buffering groove on the first insulating film is located in the first buffering groove or in the first buffering via, and the terminal end of the second buffering groove is one end of the second buffering groove away from the second buffering via.

5. The insulating film assembly according to claim 4, wherein a width of the first buffering groove decreases in a direction close to the terminal end of the first buffering groove, and a width of the second buffering groove decreases in a direction close to the terminal end of the second buffering groove.

6. The insulating film assembly according to claim 5, wherein the decreasing direction of the width of the first buffering groove is perpendicular to a battery arrangement direction, and the decreasing direction of the width of the second buffering groove is perpendicular to the battery arrangement direction.

7. The insulating film assembly according to claim 5, wherein the first buffering groove is an arc-shaped notch arranged at an edge of the first buffering via, and/or the second buffering groove is an arc-shaped notch arranged at an edge of the second buffering via.

8. The insulating film assembly according to claim 5, wherein a terminal end portion of the first buffering groove has a first side, a second side, and an end side, the first side is a line segment, the second side is a line segment, and the end side is a line segment in the first buffering groove, one end of the end side is connected to one end of the first side close to the terminal end of the first buffering groove, the other end of the end side is connected to one end of the second side close to the terminal end of the first buffering groove, such that the end side forms the terminal end of the first buffering groove, and the terminal end portion of the first buffering groove is a section of a predetermined length close to the end in the first buffering groove, and/or an terminal end portion of the second buffering groove has a first side, a second side, and an end side, the first side is a line segment, the second side is a line segment, and the end side is a line segment in the second buffering groove, one end of the end side is connected to one end of the first side close to the terminal end of the second buffering groove, the other end of the end side is connected to one end of the second side close to the terminal end of the second buffering groove, such that the end side forms the terminal end of the second buffering groove, and the terminal end portion of the second buffering groove is a section of a predetermined length close to the terminal end in the second buffering groove.

9. The insulating film assembly according to claim 5, wherein a terminal end portion of the first buffering groove has a first side and a second side, the first side in the first buffering groove is a line segment, the second side is a line segment, an end of the first side is connected to an end of the second side to form the terminal end of the first buffering groove, and the terminal end portion of the first buffering groove is a section of a predetermined length close to the terminal end in the first buffering groove, a terminal end portion of the second buffering groove has a first side and a second side, the first side in the second buffering groove is a line segment, the second side is a line segment, an end of the first side is connected to an end of the second side to form the end of the second buffering groove, and the terminal end portion of the second buffering groove is a section of a predetermined length close to the terminal end in the second buffering groove.

10. The insulating film assembly according to claim 1, wherein the first insulating film is provided with a first tear arresting hole, the first tear arresting hole is located on one side of the terminal end of the first buffering groove, and a spacing is provided between the first tear arresting hole and the first buffering groove, the second insulating film is provided with a second tear arresting hole, the second tear arresting hole is located on one side of the terminal end of the second buffering groove, and a spacing is provided between the second tear arresting hole and the second buffering groove.

11. The insulating film assembly according to claim 1, wherein the second insulating film is provided with a separation region, two sides of the separation region are provided with the second buffering vias, and the orthographic projection of the first buffering via on the second insulating film is located in the separation region.

12. The insulating film assembly according to claim 11, wherein two sides of the separation region are provided with the second buffering grooves.

13. The insulating film assembly according to claim 12, wherein terminal ends of the second buffering grooves on two sides of the separation region are opposite to each other.

14. The insulating film assembly according to claim 1, wherein the conductive layer further comprises:
a circuit board, wherein the second buffering via is located on one end of the second orthographic projection region away from the circuit board, and/or the second buffering via is located on one end of the second orthographic projection region close to the circuit board.

15. The insulating film assembly according to claim 14, wherein the conductive layer further comprises:
at least one busbar, wherein the at least one busbar comprises a plurality of busbars arranged in a battery arrangement direction,
wherein a third spacing region is provided between a first busbar and a second busbar, the first buffering via is located in an orthographic projection region of the third spacing region on the first insulating film, the second buffering via is located in an orthographic projection region of the third spacing region on the second insulating film, and the first busbar and the second busbar are any two adjacent busbars in the row of busbars.

16. The insulating film assembly according to claim 15, wherein the first buffering groove and the second buffering groove form third buffering vias penetrating the insulating film assembly between the first busbar and the second busbar, and at least one of the third buffering vias in the insulating film assembly is located between a welding region of the first busbar and a welding region of the second busbar.

17. The insulating film assembly according to claim 16, wherein one of the third buffering vias is disposed between the first busbar and the second busbar, and a distance between the third buffering via and the first busbar and a distance between the third buffering via and the second busbar are the same.

18. The insulating film assembly according to claim 17, wherein the first busbar is provided with a first positioning hole, the second busbar is provided with a second positioning hole, and the first positioning hole, the third buffer via, and the second positioning hole are located in a straight line.

19. The insulating film assembly according to claim 1, wherein the first buffering via and the first orthographic projection region are arranged in a first direction, the first direction is perpendicular to a second direction, and the second direction is a battery arrangement direction.

20. A battery apparatus, comprising the insulating film assembly according to claim 1.

* * * * *